United States Patent
Franchet et al.

(10) Patent No.: US 11,702,371 B2
(45) Date of Patent: Jul. 18, 2023

(54) COATING FOR HOT-SHAPING CORE

(71) Applicant: SAFRAN, Paris (FR)

(72) Inventors: Jean-Michel Patrick Maurice Franchet, Moissy-Cramayel (FR); Gilles Charles Casimir Klein, Mery sur Oise (FR)

(73) Assignee: SAFRAN, Paris (FR)

( * ) Notice: Subject to any disclaimer, the term of this patent is extended or adjusted under 35 U.S.C. 154(b) by 222 days.

(21) Appl. No.: 17/416,799

(22) PCT Filed: Dec. 20, 2019

(86) PCT No.: PCT/FR2019/053262
§ 371 (c)(1),
(2) Date: Jun. 21, 2021

(87) PCT Pub. No.: WO2020/128398
PCT Pub. Date: Jun. 25, 2020

(65) Prior Publication Data
US 2022/0064073 A1 Mar. 3, 2022

(30) Foreign Application Priority Data
Dec. 21, 2018 (FR) ...................................... 1873943

(51) Int. Cl.
*C04B 35/622* (2006.01)
*B23P 15/04* (2006.01)
(Continued)

(52) U.S. Cl.
CPC ........ *C04B 35/62222* (2013.01); *B23P 15/04* (2013.01); *C04B 35/505* (2013.01);
(Continued)

(58) Field of Classification Search
CPC ........... F05D 2230/211; F05D 2230/42; F05D 2230/40; F05D 2230/90; F05D 2220/36;
(Continued)

(56) References Cited

U.S. PATENT DOCUMENTS

| 5,316,203 A | 5/1994 | Rowe et al. |
| 2004/0200887 A1 | 10/2004 | Franchet et al. |

(Continued)

FOREIGN PATENT DOCUMENTS

| CN | 101033545 A | 9/2007 |
| CN | 102834220 A | 12/2012 |

(Continued)

OTHER PUBLICATIONS

French Search Report, dated Nov. 15, 2019, for French Application No. 1873943.

(Continued)

*Primary Examiner* — Moshe Wilensky
(74) *Attorney, Agent, or Firm* — Birch, Stewart, Kolasch & Birch, LLP

(57) ABSTRACT

The invention concerns a method for coating a core (1) for producing a turbomachine part (2) by isostatic compacting, for example a leading-edge shield of a blade, the coating method comprising the steps of:—S1: covering the core (1) by means of a first solution comprising a first refractory component configured to oppose the diffusion of species, the first component comprising a metal oxide,—S2: covering the core (1) by means of a second solution comprising a second component designed to bind the first component in such a way as to form a homogeneous layer, the second component comprising a mineral binder;—S3: applying a heat treatment to the covered core (1) in such a way as to dry the solution and solidify the coating.

13 Claims, 4 Drawing Sheets

Figure 1A:
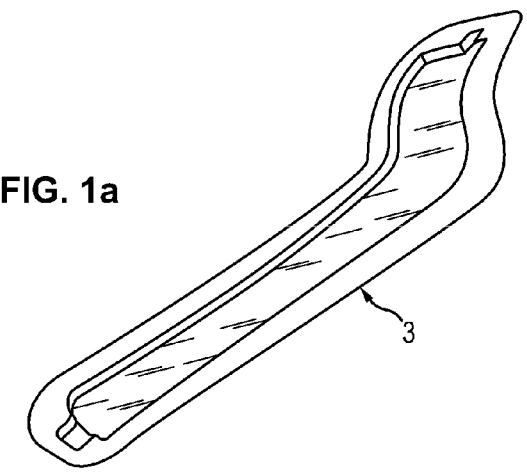

(51) Int. Cl.
*C04B 35/505* (2006.01)
*C04B 35/64* (2006.01)
*C23C 24/08* (2006.01)
*F01D 5/14* (2006.01)

(52) U.S. Cl.
CPC ............ *C04B 35/64* (2013.01); *C23C 24/082* (2013.01); *F01D 5/14* (2013.01); *C04B 2235/3217* (2013.01); *C04B 2235/3225* (2013.01); *C04B 2235/3229* (2013.01); *C04B 2235/3232* (2013.01); *C04B 2235/3256* (2013.01); *C04B 2235/3275* (2013.01); *C04B 2235/3284* (2013.01); *C04B 2235/3293* (2013.01); *C04B 2235/3418* (2013.01); *C04B 2235/3463* (2013.01); *F05D 2230/40* (2013.01); *F05D 2230/90* (2013.01); *F05D 2300/174* (2013.01)

(58) Field of Classification Search
CPC ...... F05D 2240/303; F01D 5/147; F01D 5/14; C04B 2235/3284; C04B 2235/3293; C04B 2235/3418; C04B 2235/3232; C04B 2235/3256; C04B 2235/3275; C04B 2235/3217; C04B 2235/3225; C04B 2235/3229; C04B 35/62222; C04B 35/505; C04B 35/64; C23C 24/082; B23P 15/04

See application file for complete search history.

(56) References Cited

U.S. PATENT DOCUMENTS

| | | |
|---|---|---|
| 2008/0113217 A1 | 5/2008 | Maloney et al. |
| 2013/0008027 A1 | 1/2013 | Franchet et al. |
| 2013/0283586 A1 | 10/2013 | Franchet et al. |
| 2013/0294920 A1 | 11/2013 | Klein et al. |
| 2015/0086377 A1 | 3/2015 | Leconte et al. |

FOREIGN PATENT DOCUMENTS

| | | |
|---|---|---|
| EP | 0 747 163 A1 | 12/1996 |
| EP | 1466692 A1 | 10/2004 |
| WO | WO 2012/095574 A1 | 7/2012 |
| WO | WO 2012/101356 A1 | 8/2012 |
| WO | WO 2013/178963 A1 | 12/2013 |

OTHER PUBLICATIONS

International Search Report and Written Opinion of the International Searching Authority, dated Mar. 20, 2020, for International Application No. PCT/FR2019/053262, with English translation of the International Search Report.

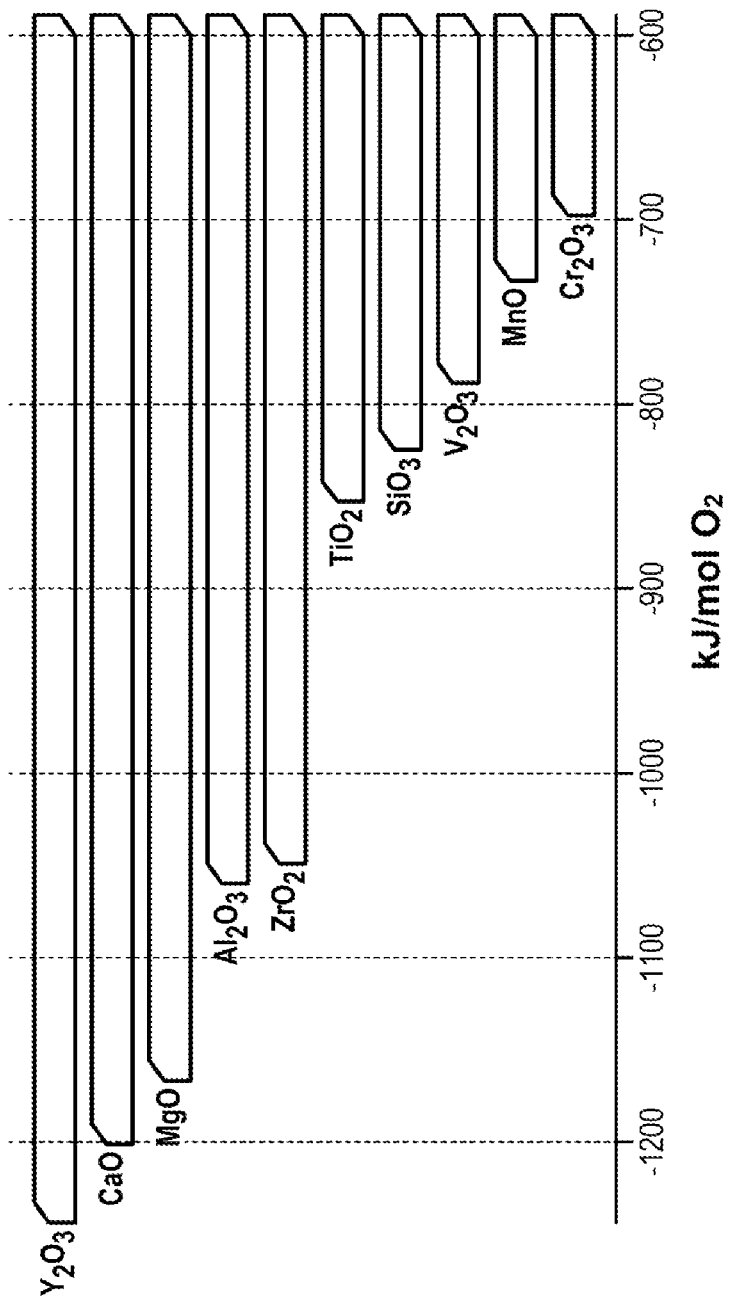

COATING FOR HOT-SHAPING CORE

GENERAL TECHNICAL FIELD AND PRIOR ART

The invention relates to the general technical field of processes for manufacturing parts 2 comprising cavities, in particular processes using cores 1 for forming production operations.

More particularly, the invention relates to refractory alloy cores 1 for processes for producing a part 2, for example a composite turbomachine fan blade, by isostatic pressing.

Conventionally, such blades have a carbon matrix composite body and a titanium or titanium alloy leading edge.

Two sheets, the pressure side and the suction side, formed beforehand, are shaped, via a hot isostatic pressing operation, around a refractory alloy core 1 whose geometry corresponds to the desired internal geometry of the leading edge of the blade.

After shaping, the core 1, which is a reusable tool, is removed and the leading edge is machined on its outer surfaces to obtain the final geometry of the part 2.

During such a process, the shaping step is carried out via a thermomechanical cycle at high temperature, of the order of 800° C. to 1000° C., during which the core 1 is in contact with the elements of the blade, and thus of the leading edge, for several hours.

Therefore, the core 1 must have three main features:
- the core 1 must be non-deformable in the thermomechanical manufacturing range of the leading edge in order to ensure the shape of the internal cavity of the leading edge; this allows, in particular, the internal cavity of the leading edge not to be machined, which simplifies the manufacturing process;
- the material composing the core 1 is chosen so as to avoid any chemical reaction between the material of the core 1 and the material of the leading edge; this makes it possible to avoid or to maximally reduce the chemical decontamination of the surfaces of the internal cavity of the leading edge, which simplifies the process;
- it is necessary to avoid any adhesion or bonding between the material of the core 1 and the material of the leading edge; this condition is necessary for the reuse of the cores 1 and thus conditions the economic viability of this process.

It is known to use nickel-based or cobalt-based metal alloys for the core 1 in order to be sufficiently rigid not to deform during the high-temperature shaping cycles.

However, these types of alloys brought into high-temperature contact with the titanium alloys (type α+β) of the part 2 are reactive with each other and form solid solutions or intermetallic compounds, which leads at best to a contamination of the titanium alloy, at worst to a prohibitive bonding between the nickel/cobalt and the titanium.

It is therefore essential to carry out a suitable treatment on the core 1 to avoid contamination and sticking.

Stop-off type products are well known and used in hot titanium forming processes with generally the dual objective of protecting the titanium against contamination from air or tools in contact with the titanium and facilitating the demolding of the part 2. They are systematically composed of an anti-diffusion refractory filler and an organic binder.

This type of product, with an organic binder, is completely prohibitive for the core 1 shaping application.

Indeed, in the case of forming processes for which the organic binder is degraded during the heating of the coated part 2 (generally between 200 and 400° C.), the degradation products are dispersed in the ambient air and this does not pose major difficulties.

For core 1 shaping, the coating is "enclosed" in a tight cavity formed by the suction-side and pressure-side sheets. During the high-temperature pressing cycle, the organic binder will degrade and the degradation residues will contaminate the contact zones between the sheets at the periphery of the assembly and prevent diffusion welding between the two sheets, which is required in these zones.

GENERAL PRESENTATION OF THE INVENTION

One goal of the invention is to allow the reuse of the core 1 for processes for forming several parts 2.

Another goal of the invention is to limit the phenomenon of diffusion of species between the core and the part.

Another goal is to limit the heat transfer phenomena between the core and the part.

Another goal is to limit the chemical reaction phenomena between the part and the core.

In order to address these issues, the invention proposes a process for coating a core for the manufacture of a turbomachine part by isostatic pressing, for example a leading-edge shield of a blade, the coating process comprising the steps of:
- S1: Coating the core with a first solution comprising a first refractory component configured to oppose species diffusion, the first component comprising a metal oxide;
- S2: Coating the core with a second solution comprising a second component configured to bind the first component so as to form a homogeneous layer, the second component comprising an inorganic binder;
- S3: Applying a heat treatment to the coated core so as to dry the solution and solidify the coating.

Optionally but advantageously, such a process may be supplemented by the following features, taken alone or in combination:
- steps S1 to S3 are repeated at least once;
- the first component comprises an oxide of a transition metal, and wherein the second component comprises a colloid of a lanthanide;
- the first solution is aqueous and the first component comprises an yttrium oxide filler in powder form;
- the second component comprises a colloidal cerium binder;
- the heat treatment step S3 is carried out at a temperature comprised between 40° C. and 120° C. for a period comprised between 15 minutes and 60 minutes, and preferentially at a temperature comprised between 70° C. and 90° C. for a period comprised between 25 and 35 minutes;
- the process further comprises, between steps S1 and S2, a step S4 of heat treatment of the core;
- during step S1, the solution comprises a mass proportion of water comprised between 40% and 60%, and a mass proportion of metal oxide comprised between 40% and 60%;
- the coating steps S1 and S2 are carried out simultaneously by applying a single solution comprising the first component and the second component.

According to another aspect, the invention proposes a core for a turbomachine part, for example a leading-edge shield of a blade, the core comprising a coating made according to a process according to the invention.

According to another aspect, the invention proposes a process for manufacturing a part for a turbomachine, for example a leading-edge shield of a blade, said part comprising an internal cavity, a first sheet and a second sheet, wherein the process comprises the steps of:

Assembling the first sheet, the second sheet and a core with a coating made according to the invention;

Isostatically pressing the assembly at a temperature configured to soften the first sheet and the second sheet so as to promote their deformation;

Extracting the core.

Optionally but advantageously, in such a process, one among the first sheet and the second sheet comprises a first material, and the core comprises a second material, the first material comprising a titanium alloy, the second material comprising an alloy of a transition metal, for example yttrium.

PRESENTATION OF THE FIGURES

Other features and advantages of the invention will emerge from the following description, which is purely illustrative and non-limiting, and should be read in conjunction with the appended figures in which:

FIG. 1 represents the various steps of a hot-shaping process for a turbomachine blade according to the invention; FIG. 1a represents the previously formed pressure-side sheet; FIG. 1b represents the pressure-side sheet in which the core 1 is positioned; FIG. 1c represents the suction-side sheet, positioned on the core 1, itself positioned on the pressure-side sheet. The whole constituting the assembly to be shaped; FIG. 1d represents a cross-section of the assembly, revealing the core 1, the pressure-side and suction-side sheets being fixed to each other prior to hot shaping; FIG. 1e represents a cross-section of the assembly, revealing the core 1 and the part 2 formed after the hot-shaping step; FIG. 1f represents the part 2 formed, with the core 1 in the cavity of the part 2; FIG. 1g represents the final part 2 after extraction of the core 1;

FIG. 2 represents free enthalpies of formation of various oxide species.

DESCRIPTION OF ONE OR MORE EMBODIMENTS

The invention relates to a process for coating a core 1 for the manufacture of a turbomachine blade by isostatic pressing, the coating process comprising the steps of:

S1: Coating the core (1) with a solution comprising a first refractory component configured to oppose species diffusion, the first component comprising a metal oxide, S2: Coating the core (1) with a solution comprising a second component configured to bind the first component so as to form a homogeneous layer, the second component comprising an inorganic binder;

S3: Applying a heat treatment to the coated core (1) so as to dry the solution and solidify the coating.

The core 1 is thus coated with a non-permanent, anti-diffusion coating, which comprises a first component, or filler, which is refractory and thermodynamically very stable, anti-diffusing, and non-reactive with the material of the part 2, even at a temperature of the order of 1000° C., and a second component, or binder, which is inorganic, so as not to contaminate, during hot isostatic pressing, the material of the part 2.

The process can optionally comprise a reiteration of steps S1 to S3, which allows the thickness of the coating obtained to be adapted according to need.

"Binder" is conventionally understood to mean a product that serves to agglomerate solid particles in the form of powder or granules into a solid mass.

Advantageously, the first component has a very negative free enthalpy of formation at 25° C. for the formation of its oxide. This oxide will therefore be extremely stable. Moreover, in order to be inert with respect to the material of the part 2 (titanium), the free enthalpy of formation of the oxide of the component will advantageously be lower than that of titanium oxide (TiO2), titanium being the main chemical element of the material of the part 2.

Such a coating prevents interdiffusion of species between a part 2 and the core 1, which greatly limits the adhesion between the part 2 and the core 1 and promotes the removal and reuse of the core 1 during a subsequent manufacturing process of a part 2.

Such a manufacturing process is shown in FIG. 1.

In an embodiment, such a process may comprise a step, not shown, of cutting and then machining sheets intended to form the part 2.

For example, in the case of a turbomachine blade, a first sheet comprises a sheet intended to form the pressure side of the blade, and a second sheet comprises a sheet intended to form the pressure side of the blade.

Such a process can also include a hot shaping step, during which the sheets intended to form the pressure side and suction side are hot forged in order to give them a preform that approximates the shape of the core in order to simplify the assembly of the sheets around the core.

Figure 1B:
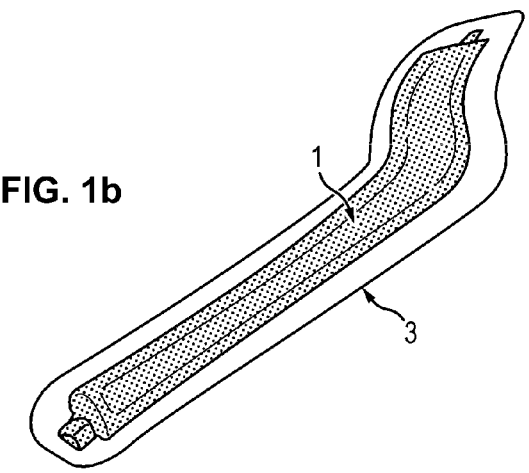
Figure 1C:
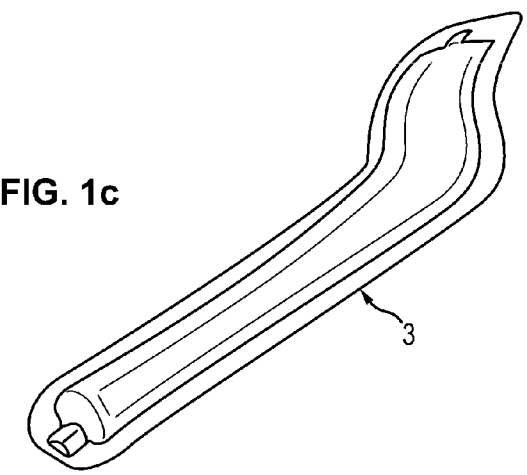

An assembly step is then performed, during which the first sheet, the second sheet and the core 1 are positioned relative to each other and held together, as illustrated in FIGS. 1a to 1c.

Figure 1D:
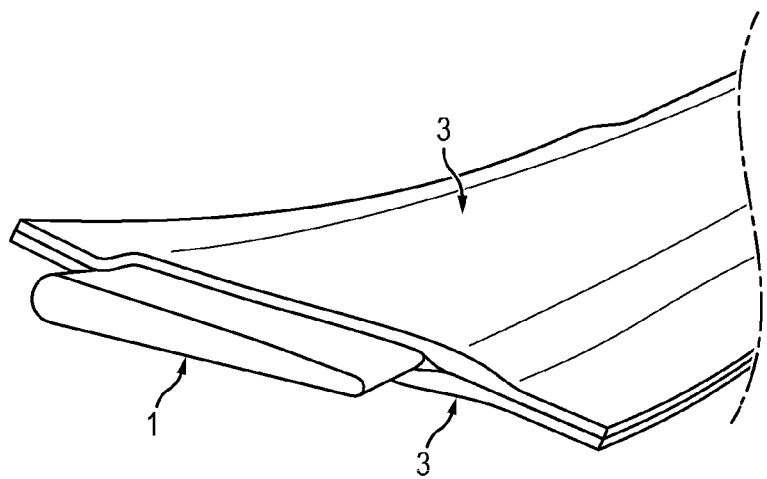

The pressure-side and suction-side sheets are fixed to each other, for example by welding at the lateral edges of said sheets, in order to guarantee the positioning of the sheets around the core and to ensure the tightness of the assembly, as illustrated in FIG. 1d.

Figure 1E:
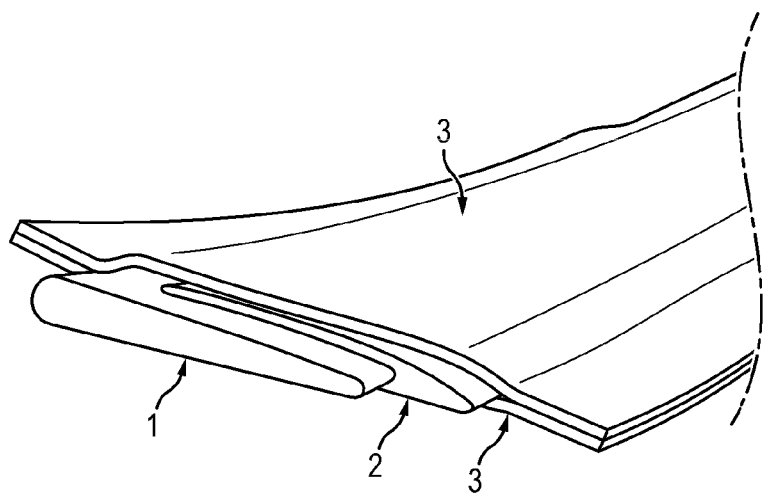

An isostatic pressing step is then carried out, during which the sheets and the core are heated to a temperature of the order of 800° C. to 1000° C. and compacted by an external pressure so as to join the sheets together by diffusion welding, to shape them around the core and thus to form the part 2, as illustrated in FIG. 1e, comprising an internal cavity with the exact geometry of the core.

After hot isostatic pressing, the part 2 formed is obtained by removing the core. In an embodiment, an additional machining step can be performed, such as machining the leading edges in the case of a turbomachine blade.

Figure 1F:
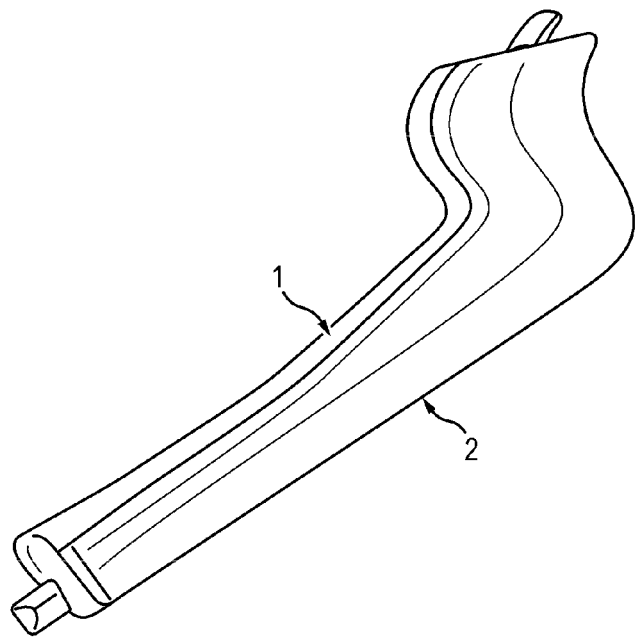

Preferentially, the machining step is carried out with the core 1 in the cavity of the part 2, as illustrated in FIG. 1f. This makes it possible to stiffen the assembly, in particular avoiding deformation of the part 2 under the machining forces, and to have integrated dimensional references, thus avoiding the need for complex machining tools.

Figure 1G:
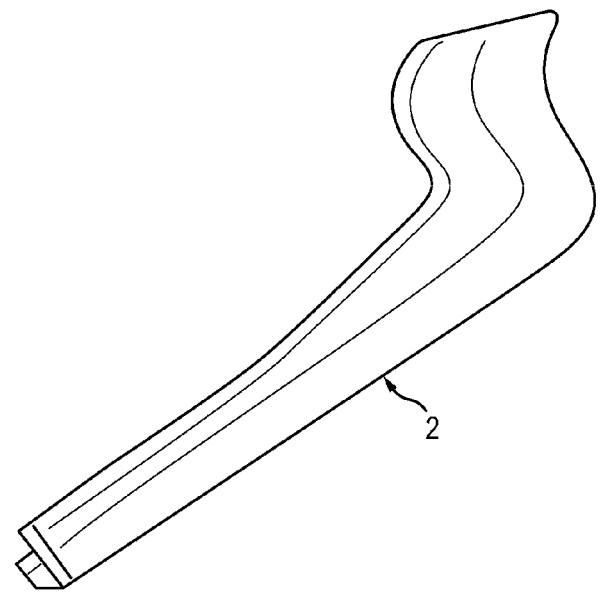

The core 1 is then removed, as illustrated in FIG. 1g, and can be reused in a production operation for another part 2. This greatly reduces the unit cost of manufacturing a part 2.

In an embodiment, the first component comprises an yttrium oxide and optionally another oxide selected from one or a plurality of metal oxide powders, which may for example comprise an oxide or combination of oxides selected from:

titanium oxide (TiO2), molybdenum oxide (MoO3),
cerium oxide (CeO2),
tin oxide (SnO2),
zinc oxide (ZnO),
cobalt oxide (Co2O3),
alumina (Al2O3),
mullite (3 Al2O3+2 SiO2),
silica (SiO)

In an embodiment, the first component comprises in particular one or a combination of transition metal oxides.

In a preferential embodiment, the first component comprises yttrium oxide (Y2O3) powder. This makes it possible, in particular when the part 2 comprises titanium or a titanium alloy, to very greatly limit or even avoid contamination of the titanium during a thermal cycle according to the process.

In an embodiment, the part 2 is made of a titanium alloy. FIG. 2 shows the free enthalpies of formation of various oxides. In this configuration, yttrium oxide appears to be the best candidate among the oxides shown, exhibiting a free enthalpy of formation much lower than the free enthalpy of formation of titanium oxide. Titanium being the main chemical element of the part 2, yttrium oxide will be inert towards titanium.

In an embodiment, the second component comprises an inorganic colloid in an aqueous medium.

"Colloid" is understood to mean a suspension of one or more substances, regularly dispersed in another substance, forming a system with two separate phases. In a fluid, it forms a homogeneous dispersion of particles whose dimensions range from nanometer to micrometer. These particles are therefore the size of a nanoparticle, although they are not specifically considered as such.

Advantageously, the second component comprises a lanthanide colloid, for example one or a combination of colloids selected from an yttrium colloid, a titanium colloid (basic or acidic) and a cerium colloid.

In a preferential embodiment, the part 2 is made of a titanium alloy, and the second component comprises a cerium colloid. This greatly limits or even prevents any contamination of the part 2 by cerium.

In an embodiment, the solution used for coating thus comprises:
An yttrium oxide (Y2O3) filler in powder form,
A cerium colloid (CeO2) binder,
Water.

In an embodiment, the coating is deposited in two passes, the deposition process comprising:
a first coating step during which a first solution comprising the first component is deposited on the core 1,
a first step of heating the core 1,
a second coating step during which a second solution comprising the second component is deposited on the core 1, and
a second heating step.

Optionally, the first solution comprises a mass proportion of water comprised between 40% and 60%, and a mass proportion of metal oxide comprised between 40% and 60%, preferentially a mass proportion of water comprised between 50% and 55%, and a mass proportion of metal oxide comprised between 45% and 50%, for example a mass proportion of water of 53% and a mass proportion of yttrium oxide (Y2O3) of 47%.

Optionally, the second solution comprises a cerium colloid (CeO2).

Advantageously, the first heating step is carried out at a temperature comprised between 40° C. and 120° C. for a period comprised between 15 minutes and 60 minutes, preferentially at a temperature comprised between 70° C. and 90° C. for a period comprised between 25 minutes and 35 minutes, for example at a temperature of 80° C. for a period of 30 minutes.

Optionally, the second heating step is carried out at a temperature comprised between 40° C. and 120° C. for a period comprised between 15 minutes and 60 minutes, preferentially at a temperature comprised between 70° C. and 90° C. for a period comprised between 25 minutes and 35 minutes, for example at a temperature of 80° C. for a period of 30 minutes.

Advantageously, the coating has a thickness comprised between 10 μm and 30 μm, for example 20 μm. This effectively isolates the core 1 from the part 2, by presenting a thickness that resists any wear or scratches that may occur during the operations of removing the core 1 when the part 2 is formed. Such a thickness also makes it possible to avoid modifying the dimensions of the core 1, and therefore of the cavity formed, too significantly.

The invention claimed is:

1. A process for coating a core for a manufacture of a turbomachine part by isostatic pressing, the coating process comprising the steps of:
   S1: Coating the core with a first solution comprising a first refractory component configured to oppose species diffusion,
   the first component comprising a metal oxide;
   S2: Coating the core with a second solution comprising a second component configured to bind the first component so as to form a homogeneous layer,
   the second component comprising an inorganic binder; and
   S3: Applying a heat treatment to the coated core so as to dry the solution and solidify the coating.

2. The coating process as claimed in claim 1, wherein steps S1 to S3 are repeated at least once.

3. The coating process as claimed in claim 1, wherein the first component comprises an oxide of a transition metal, and
the second component comprises a colloid of a lanthanide.

4. The coating process as claimed in claim 1, wherein the first solution is aqueous, and
the first component comprises an yttrium oxide filler in powder form.

5. The coating process as claimed in claim 1, wherein the second component comprises a cerium colloid binder.

6. The coating process as claimed in claim 1, wherein the heat treatment step S3 is carried out at a temperature comprised between 40° C. and 120° C. for a period comprised between 15 minutes and 60 minutes.

7. The coating process as claimed in claim 1, wherein the heat treatment step S3 is carried out at a temperature comprised between 70° C. and 90° C. for a period comprised between 25 and 35 minutes.

8. The process as claimed in claim 1, further comprising, between steps S1 and S2, a step S4 of heat treatment of the core.

9. The process as claimed in claim 8, wherein, during step S1, the solution comprises a mass proportion of water comprised between 40% and 60%, and a mass proportion of metal oxide comprised between 40% and 60%.

10. The coating process as claimed in claim 1, wherein the coating steps S1 and S2 are performed simultaneously by applying a single solution comprising the first component and the second component.

11. A manufacturing process for manufacturing a turbomachine blade,
the blade comprising an internal cavity, a first sheet and a second sheet, wherein the process comprises the steps of:
assembling the first sheet, the second sheet and a core comprising a coating made as claimed in claim 1;
isostatically pressing the assembly at a temperature configured to soften the first sheet and the second sheet so as to promote their deformation; and
extracting the core.

12. The manufacturing process as claimed in claim 11, wherein
one among the first sheet and the second sheet comprises a first material;
the core comprises a second material;
the first material comprising a titanium alloy; and
the second material comprising an alloy of a transition metal.

13. The manufacturing process as claimed in claim 12, wherein the second material comprises an alloy of yttrium.

\* \* \* \* \*